(12) United States Patent
Leyva

(10) Patent No.: US 6,587,968 B1
(45) Date of Patent: Jul. 1, 2003

(54) CAN BUS TERMINATION CIRCUITS AND CAN BUS AUTO-TERMINATION METHODS

(75) Inventor: Ricardo Osuna Leyva, Guadalajara (MX)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/354,878

(22) Filed: Jul. 16, 1999

(51) Int. Cl.[7] ................................................. G06F 11/00
(52) U.S. Cl. ....................................................... 714/43
(58) Field of Search ......................... 714/43, 56; 326/30

(56) References Cited

U.S. PATENT DOCUMENTS

| | | | |
|---|---|---|---|
| 5,216,674 A | * | 6/1993 | Peter et al. ..................... 714/43 |
| 5,323,385 A | | 6/1994 | Jurewicz et al. ............... 370/43 |
| 5,448,180 A | | 9/1995 | Kienzler et al. ............... 326/15 |
| 5,539,778 A | | 7/1996 | Kienzler et al. ............. 375/317 |
| 5,551,053 A | | 8/1996 | Nadolski et al. ............ 395/829 |
| 5,574,848 A | | 11/1996 | Thomson ..................... 395/181 |
| 5,600,782 A | | 2/1997 | Thomson ............... 395/182.02 |
| 5,675,830 A | | 10/1997 | Satula ......................... 395/829 |
| 5,765,031 A | * | 6/1998 | Mimuth et al. ............... 714/43 |
| 6,115,831 A | * | 9/2000 | Hanf et al. ................... 714/43 |

* cited by examiner

Primary Examiner—Trong Phan

(57) ABSTRACT

CAN bus termination circuits, and CAN bus auto-termination methods are described. In one embodiment, a CAN bus termination circuit includes a first circuit in electrical communication with a CAN bus. The first circuit is configured to monitor an electrical operating parameter associated with operation of the CAN bus. A second circuit is in electrical communication with the first circuit, and is selectively enabled by the first circuit responsive to the first circuit's sensing a change in the electrical operating parameter that it is configured to monitor. When enabled, the second circuit terminates the CAN bus.

19 Claims, 8 Drawing Sheets

US 6,587,968 B1

CAN BUS TERMINATION CIRCUITS AND CAN BUS AUTO-TERMINATION METHODS

TECHNICAL FIELD

This invention relates to CAN bus termination circuits and to CAN bus auto-termination methods.

BACKGROUND OF THE INVENTION

The Controller Area Network (CAN) protocol is a serial communication protocol for communicating between various electronic devices or nodes. CAN protocol has been used, in the past, in connection with vehicles such as automobiles. In accordance with CAN protocol, multiple different electronic devices or nodes can be coupled to a single serial bus, such that messages and data may be sent from one electronic device to another. The CAN protocol is a message-based protocol wherein CAN frames are placed on a common CAN bus. The CAN bus may be a single wire or may be a differentially driven pair of wires. Each electronic device or node on the common CAN bus receives each frame present on the bus and filters out those frames that are not required in performing that node's tasks. For example, if a device associated with an automobile dashboard sends onto the CAN bus a frame requesting that the automobile headlights be turned on, then the device on the CAN bus responsible for the brake lights can determine that the frame is intended for another device and therefore will not act upon the frame. The device controlling the headlights, however, receives and acts upon the frame by turning the headlights on. Identifier bits are therefore provided in CAN frames to allow messages and data to be directed to certain nodes on the CAN bus, and not to other nodes on the CAN bus.

By virtue of the fact that signals are propagated on a common bus, noise and signal reflections are always a concern. Specifically, noise can corrupt signals carried on the CAN bus thereby leading to, in some instances, erroneous device behavior. In the same way, reflected signals can also compromise the integrity the system. To address signal reflection concerns, resistors, e.g. 120 ohm resistors, are typically incorporated into the CAN bus circuit at the ends of the CAN bus. Resistors must also typically be provided to satisfy driver requirements of a resistive load, e.g. in the ISO11898, the drivers require 60 ohms of resistive load. The requires finding the last nodes, e.g. at each end, on a CAN bus, and adding a termination resistor to the ends. Because CAN bus nodes are connected in parallel, it is not always an easy task to find the last node. Moreover, where an undetermined number of nodes are present, determining what devices are at the ends of the CAN bus is not an easy task.

This invention arose out of concerns associated with providing CAN bus systems and methods that are more flexible and adaptable than those that currently exist.

SUMMARY OF THE INVENTION

CAN bus termination circuits, and CAN bus auto-termination methods are described.

In one embodiment, a CAN bus termination circuit includes a first circuit in electrical communication with a CAN bus. The first circuit is configured to monitor an electrical operating parameter associated with operation of the CAN bus. A second circuit is in electrical communication with the first circuit, and is selectively enabled by the first circuit responsive to the first circuit's sensing a change in the electrical operating parameter that it is configured to monitor. When enabled, the second circuit terminates the CAN bus.

In another embodiment, a CAN bus system includes a CAN bus and a plurality of nodes distributed along and operably connected with the CAN bus. A power-on signal generation circuit has an output line that is coupled with the nodes and enables the nodes. Each node includes a termination circuit that is connected to the output line. The termination circuit monitors for a predetermined electrical condition, and responsive to sensing the predetermined electrical condition, terminates the CAN bus.

In another embodiment, a CAN bus auto-termination method includes the steps of monitoring an electrical operating parameter associated with operation of at least one CAN bus node of a CAN bus, and terminating the CAN bus responsive to an occurrence of a determinable characteristic of the electrical operating parameter.

DETAILED DESCRIPTION OF THE INVENTION

The discussion below assumes that the reader has some familiarity with CAN bus systems. Various aspects of CAN bus systems are described in the following U.S. Patents, the disclosures of which are incorporated by reference: U.S. Pat. Nos. 5,574,848, 5,551,053, 5,323,385, 5,539,778, 5,600, 782, 5,675,830, and 5,448,180.

Figure 1:
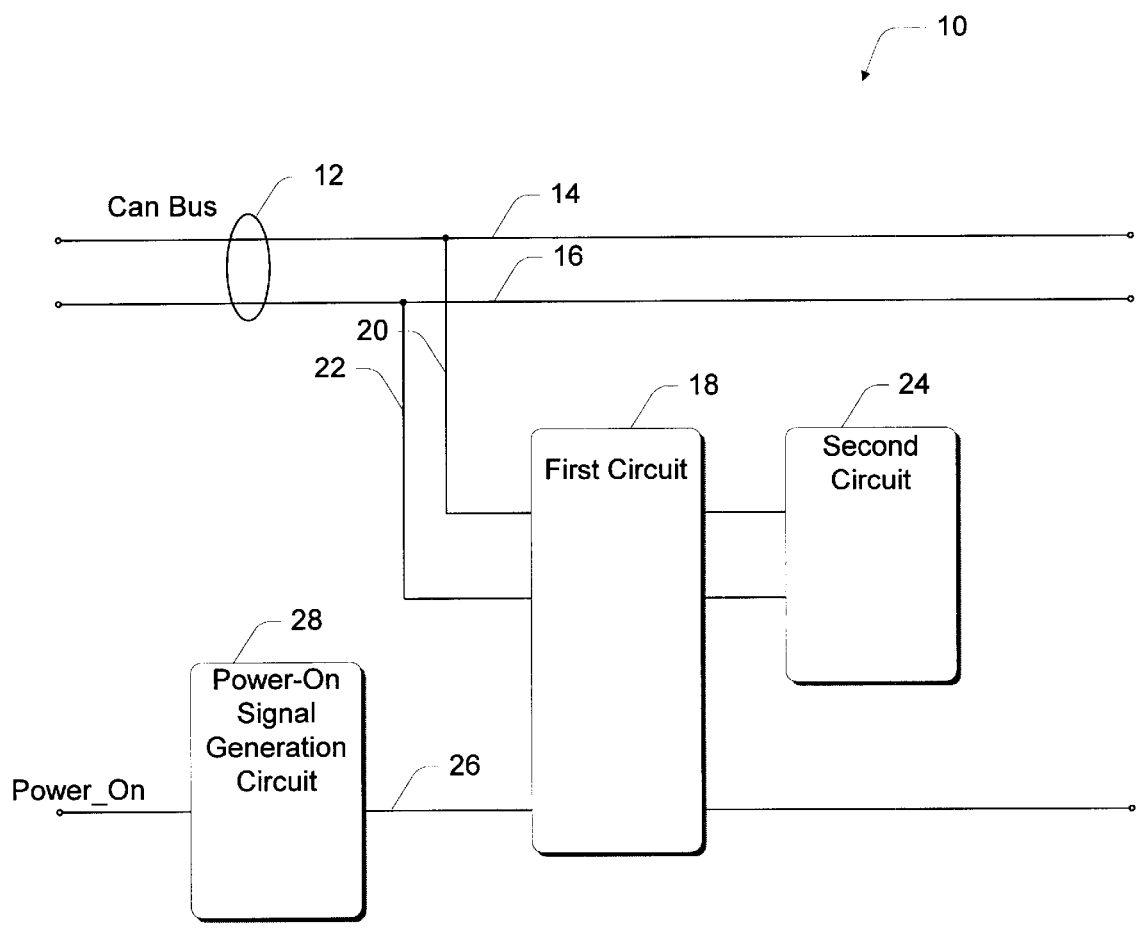
FIG. 1 is a block diagram of a CAN bus termination circuit in accordance with one or more embodiments of the invention.

FIG. 1 shows a circuit generally at 10 that includes a CAN bus termination circuit in accordance with one embodiment. Circuit 10 includes a CAN bus 12 that includes, in this example, first and second signal-carrying lines 14, 16. The CAN bus termination circuit, in this example, includes a first circuit 18 in electrical communication with the CAN bus by virtue of a connection to signal-carrying lines 14, 16 via a pair of input lines 20, 22 respectively. The first circuit is preferably configured to monitor an electrical operating parameter that is associated with operation of the CAN bus. The electrical operating parameter can be any suitable electrical operating parameter, with an exemplary operating parameter being given below in connection with FIG. 2. The termination circuit also includes a second circuit 24 in electrical communication with first circuit 18. Second circuit 24 is selectively enabled by the first circuit 18 responsive to the first circuit's sensing a change in the electrical operating parameter that it is configured to monitor. The second circuit 24 preferably terminates the CAN bus when it is enabled by the first circuit 18.

In the example of FIG. 1, a Power_On line 26 is provided and, together with a power-on signal generation circuit 28 provides a signal that is used to turn on the power supplies of the individual nodes or devices along the CAN bus and connected to the Power_On line. The Power_On line 26 is provided to turn on the individual nodes along the CAN bus 12.

Figure 2:
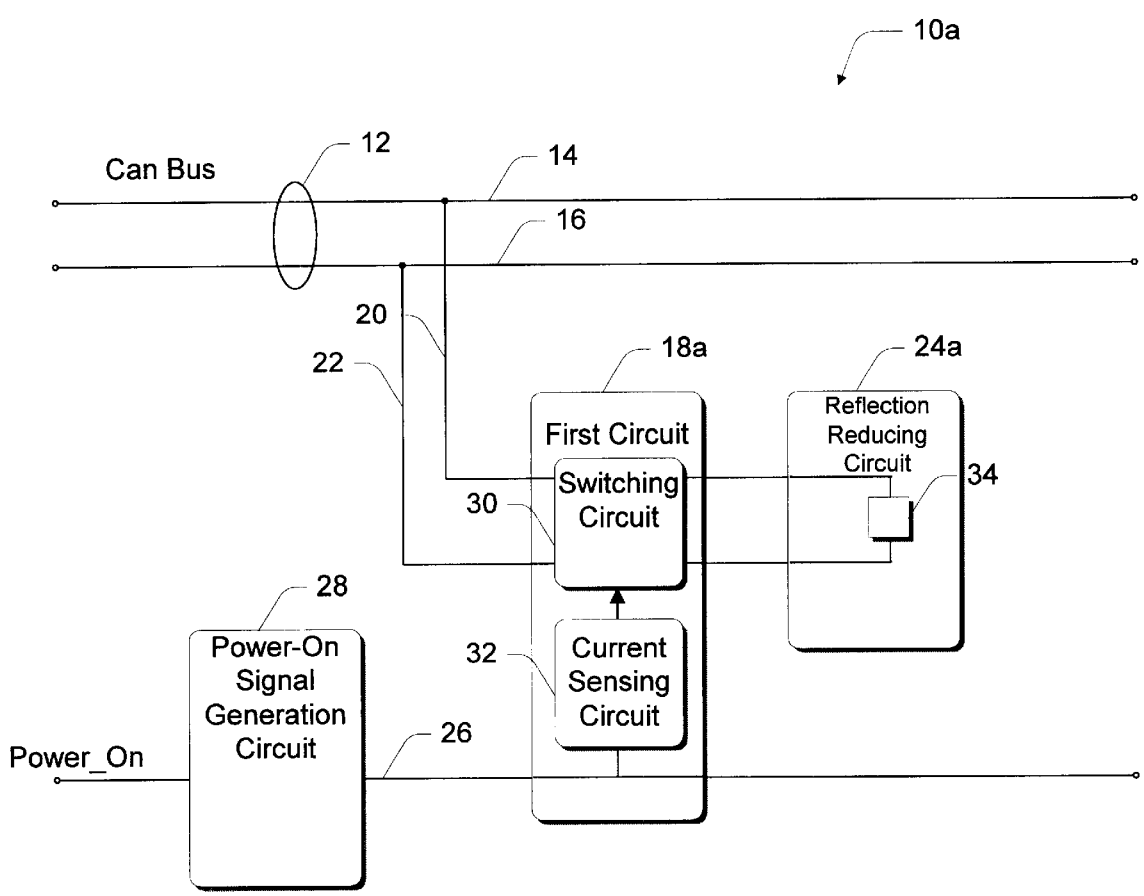
FIG. 2 is a block diagram of a CAN bus termination circuit in accordance with one or more embodiments of the invention.

FIG. 2 shows one embodiment generally at 10a. Like numerals from the FIG. 1 embodiment are used where appropriate, with differences being indicated with the suffix "a", or with different numerals. Here, first circuit 18a includes a switching circuit 30 and a current-sensing circuit 32. Second circuit 24a comprises a reflection-reducing circuit which, in this example comprises a resistive element or circuit 34. Current-sensing circuit 32 is preferably configured to sense an operating current associated with operation of the CAN bus. In this example, the operating current is provided by the Power_On line 26. The current-sensing circuit 32 is operably connected with the switching circuit 30. The switching circuit 30 is connected to the CAN bus by lines 20, 22. When the current-sensing circuit 32 senses a determinable electrical current, e.g., a change in the monitored operating current, the switching circuit selectively incorporates the reflection-reducing circuit 24a which, in turn, causes the resistive element or circuit 34 to terminate the CAN bus. In a preferred embodiment, the reflection-reducing circuit comprises a resistive loading circuit.

Any suitable current sensing circuit can be used. In this example, an operational amplifier and a transistor can form the basis of a current-to-voltage current sensing circuit. By using a relay in switching circuit 30, the output of the current-to-voltage current-sensing circuit 32 can be used to turn the relay on, thereby incorporating the reflection-reducing circuit 24a. This, of course, constitutes but one example and is not intended to be limiting in any way. Accordingly, other circuit elements that are different from, or additional to those described immediately above can be used to implement the first and second circuits.

Figure 3:
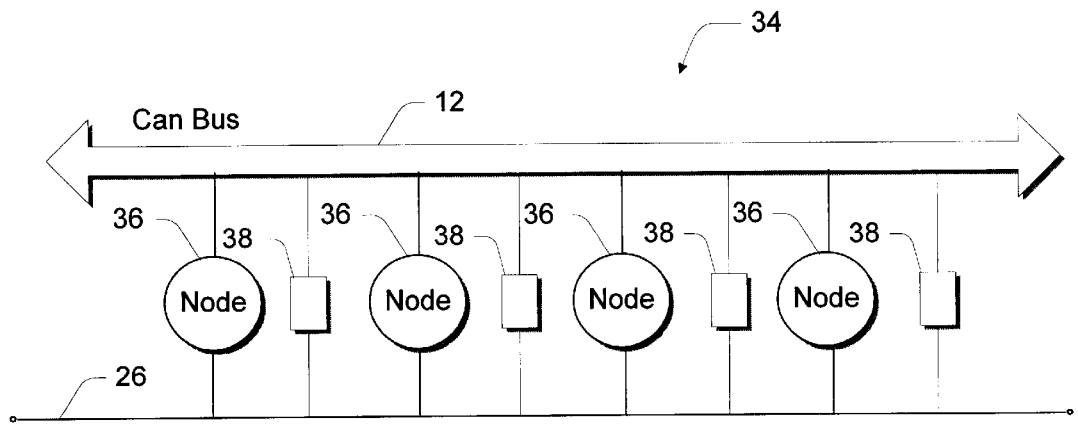
FIG. 3 is a diagram of a CAN bus system in accordance with one embodiment of the invention.
Figure 10:
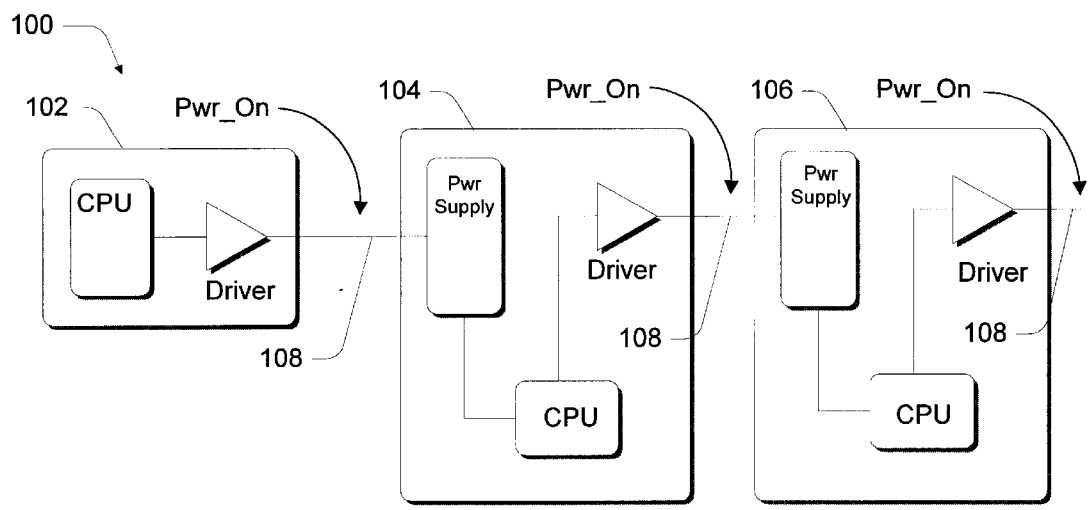
FIG. 10 is a diagram of a portion of an exemplary CAN bus.

FIG. 3 shows a CAN bus system generally at 34 that includes a plurality of nodes 36 distributed along and operably connected with the CAN bus 12. A power-on signal-generation circuit is provided (such as circuit 28 in FIG. 1) although it is not specifically shown in this figure. The power-on signal-generation circuit has an output line 26 that is coupled with the nodes 36 as shown. A power-on signal is provided in series with each node and is regenerated at each node in order for the system to determine which node is the last node in a given chain as will become apparent below. The output line 26 is configured to enable the nodes or turn them on. Each node along the illustrated CAN bus is provided with a termination circuit 38 that is connected to the output line 26 and CAN bus 12. The termination circuit is configured to monitor for a predetermined electrical condition and responsive to sensing the predetermined condition it terminates the CAN bus at that node. This provides for a great degree of flexibility because each node can terminate the CAN bus itself. FIG. 10 shows an exemplary portion of a CAN bus system at 100 in which a power on signal is provided in cascaded fashion from node to node. Specifically shown is a controller 102 and two nodes 104, 106. In the illustrated example, the controller comprises part of a printer and nodes 104, 106 comprise either input or output devices. Controller 102 includes a CPU and a driver (not specifically designated). A power-on line 108 connects either the controller 102 to a next node 104, or connects a node with a next node, e.g. nodes 104, 106. Each node 104, 106 includes a power supply connected to the power-on line 108, a CPU connected to the power supply, and a driver connected to the CPU for driving the power on signal to a next node. Each power on signal that is present on the power-on line 108 must be regenerated in order for it to signal the next-in-line node. This means that each node is responsible for regenerating a power on signal for a next node. In this example, the predetermined condition that the termination circuit monitors is the presence or absence of a power on signal for a next-in-line node. Specifically, since each node is responsible for generating a power on signal that is cascaded through the nodes, the last node in a given chain will not generate such a signal because there is no additional node that needs to receive it. The termination circuit preferably determines when this condition occurs and responsive thereto, terminates the CAN bus.

Figure 4:
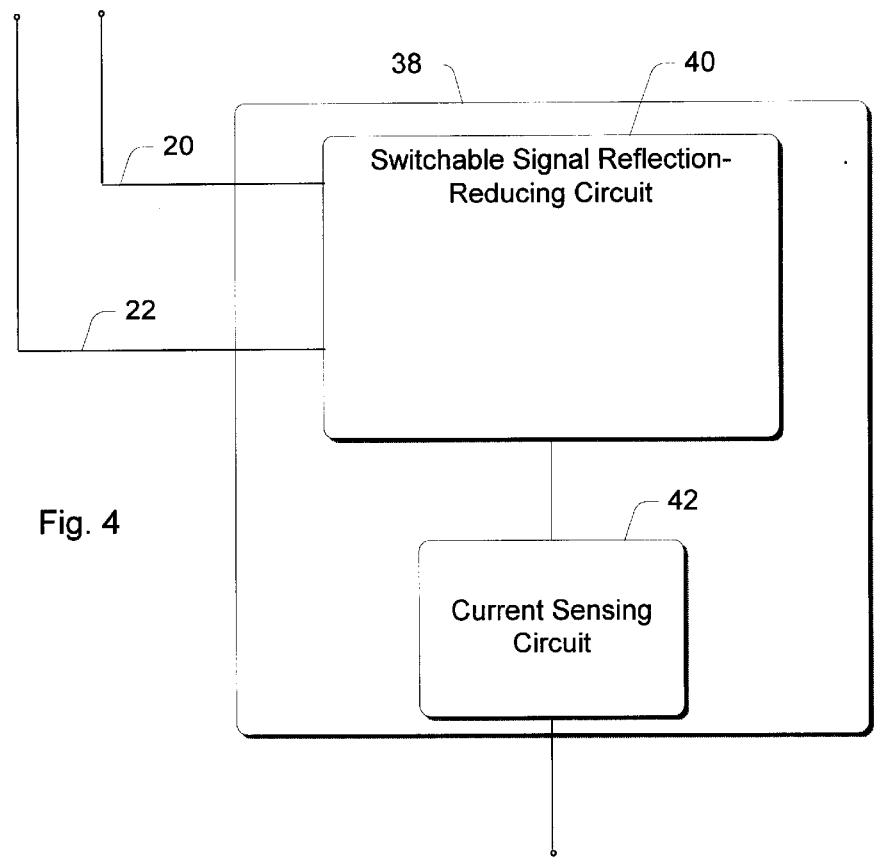
FIG. 4 is a block diagram of a CAN bus termination circuit in accordance with one or more embodiments of the invention.
Figure 11:
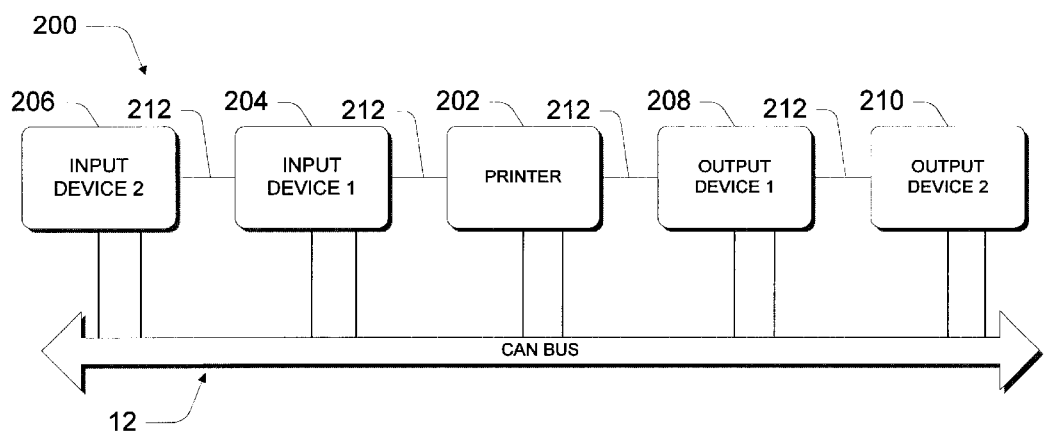
FIG. 11 is a diagram of an exemplary CAN bus.

FIG. 4 shows one embodiment of a suitable termination circuit 38. In this embodiment, termination circuit 38 includes a switchable signal-reflection-reducing circuit 40 and a current-sensing circuit 42. Switchable signal-reflection-reducing circuit 40 is configured to, upon termination of the CAN bus, reduce signal reflection in the CAN bus. Any suitable reflection-reducing circuit can be used. Current-sensing circuit 42 is configured to monitor for a predetermined electrical condition comprising current flow through output line 26. In this example, the nodes 36 are arranged along the CAN bus 12 in a manner in which each node is responsible for generating a signal to turn on the next node. The current-sensing circuit is configured to sense when there is not an additional node that needs to be turned on based upon the current flow through the output line 26. For example, FIG. 11 shows an exemplary CAN system generally at 200 that includes a printer/controller 202, and a plurality of nodes 204, 206, 208, and 210. Nodes 204 and 206 are input devices, and nodes 208 and 210 are output devices. The printer 202 is connected to a next-in-line node by a power-on signal line 212. Each node, in turn, is connected to a next-in-line node by a power-on signal line 212. The CAN bus is in parallel with all of the nodes (printer and devices), and the power on line 212 is first generated by the printer 202, and then cascaded to both sides, i.e. the input and the output devices. The printer 202 has two output connections that correspond to the power on lines 212 that connect with the input and output devices. The output connections of the printer each connect with a separate power-on signal-generation circuit. Both the input and output devices have connections that receive an input from the power on line 212 and the CAN bus lines. The input and output devices also include output connections that are received by the next-in-line respective input or output device. The power on signal is generated separately for the input and output devices, and each node is responsible for generating a power-on signal for a next-in-line node. In this example, if input device 204 was the last node in the chain of input devices, there would be no current flowing through the power-on line 212 that connects it and input device 206. By recognizing this, a current-sensing circuit can determine that there is not sufficient current to provide a power-on signal to the next device (which does not exist), and hence can switch the signal reflection-reducing circuit into the circuit and terminate the CAN bus.

Figure 5:
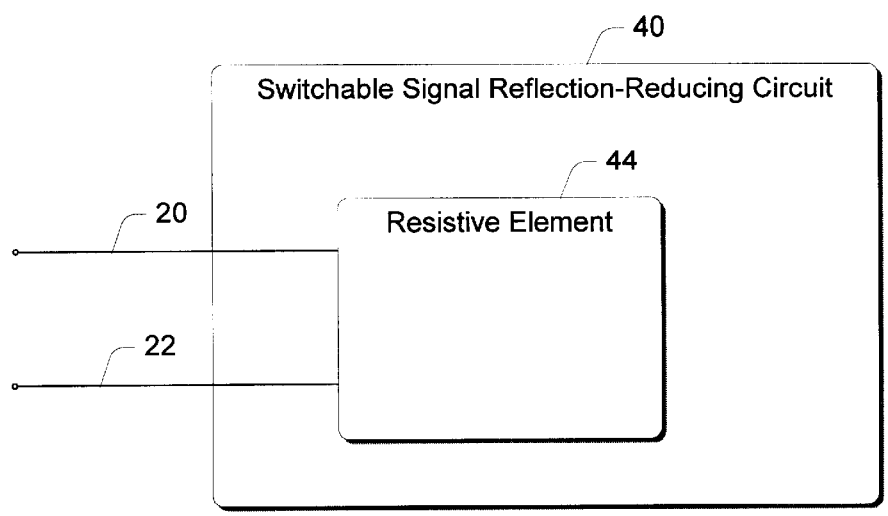
FIG. 5 is a block diagram of a signal reflection-reducing circuit in accordance with one embodiment of the invention.

FIG. 5 shows one exemplary switchable signal reflection-reducing circuit 40 that includes a resistive element 44. Resistive element 44 can be any suitable resistive element that is capable of reducing signal reflection and keeping the specific resistive load in the terminated CAN bus. This circuit is configured to be selectively switched by the current-sensing circuit 42 (FIG. 4) when the current-sensing circuit senses a predetermined current magnitude through the output line 26 (FIG. 3).

Figure 6:
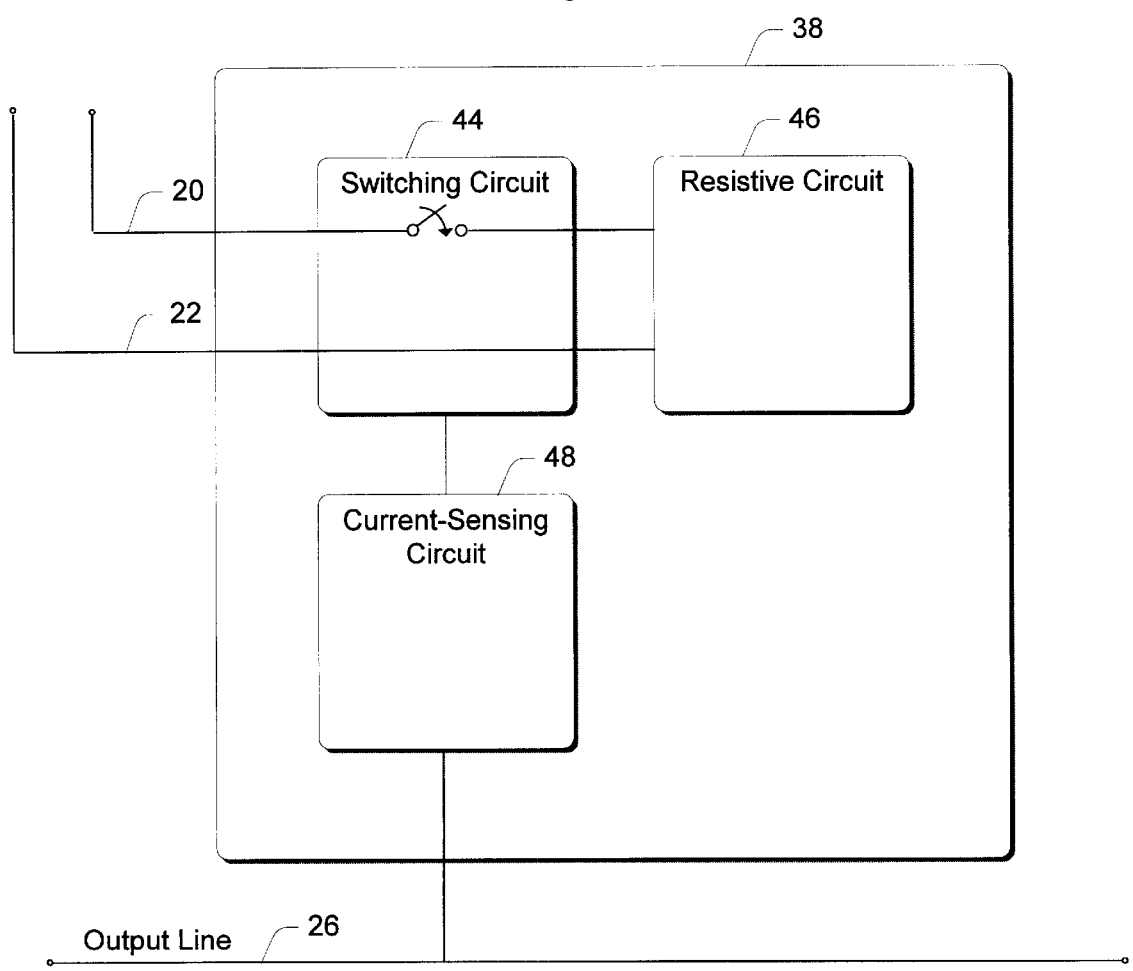
FIG. 6 is a block diagram of a CAN bus termination circuit in accordance with one or more embodiments of the invention

FIG. 6 shows another embodiment of a termination circuit 38. Here, the termination circuit includes a switching circuit 44 connected with the first and second signal-carrying lines of the CAN bus. The switching circuit has an output that is connected to a resistive circuit 46. The switching circuit is configured to selectively enable or incorporate the resistive circuit 46 into its own circuit. The resistive circuit 46 is configured to reduce signal reflection and keep the specified resistive load in the first and second signal-carrying lines 14, 16 when it is incorporated into the CAN bus circuit. A current-sensing circuit 48 is provided and connected with the switching circuit 44. The current-sensing circuit monitors current flow through the output line 26. The current flow is preferably measured in series. When a predetermined current is sensed, indicating that the node with which the termination circuit is operably connected is the last node on the chain, the current-sensing circuit 48 switches the switching circuit 44 from a disabled state in which the resistive circuit is not incorporated into the CAN bus circuit, to an enabled state in which the resistive circuit is incorporated into the CAN bus circuit.

Figure 7:
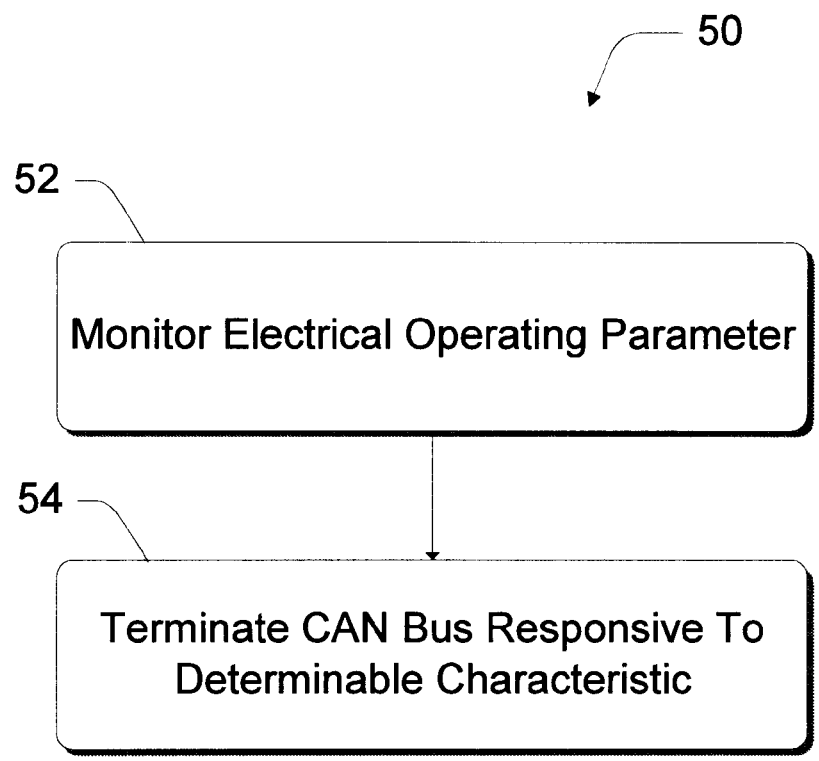
FIG. 7 is a flow diagram that illustrates a processing steps in accordance with one embodiment of the invention.

FIG. 7 shows a flow diagram 50 that describes processing steps in accordance with an embodiment of the invention. At 52, an electrical operating parameter that is associated with operation of at least one, and preferably a plurality of CAN bus nodes of a CAN bus is monitored. In a preferred embodiment, an electrical current flow is monitored. In the examples above, the electrical current flow is associated with that which is required to turn on a next-in-line node. At 54, the CAN bus is terminated responsive to an occurrence of a determinable characteristic of the electrical operating parameter. In this example, the electrical operating parameter is the current flow described above. Accordingly, an exemplary determinable characteristic can be a change in magnitude of the monitored current. In a preferred embodiment, termination of the CAN bus takes place by enabling a circuit that is configured to reduce signal reflection in the CAN bus. Most preferably, this takes place by incorporating a resistive element into the circuit.

Figure 8:
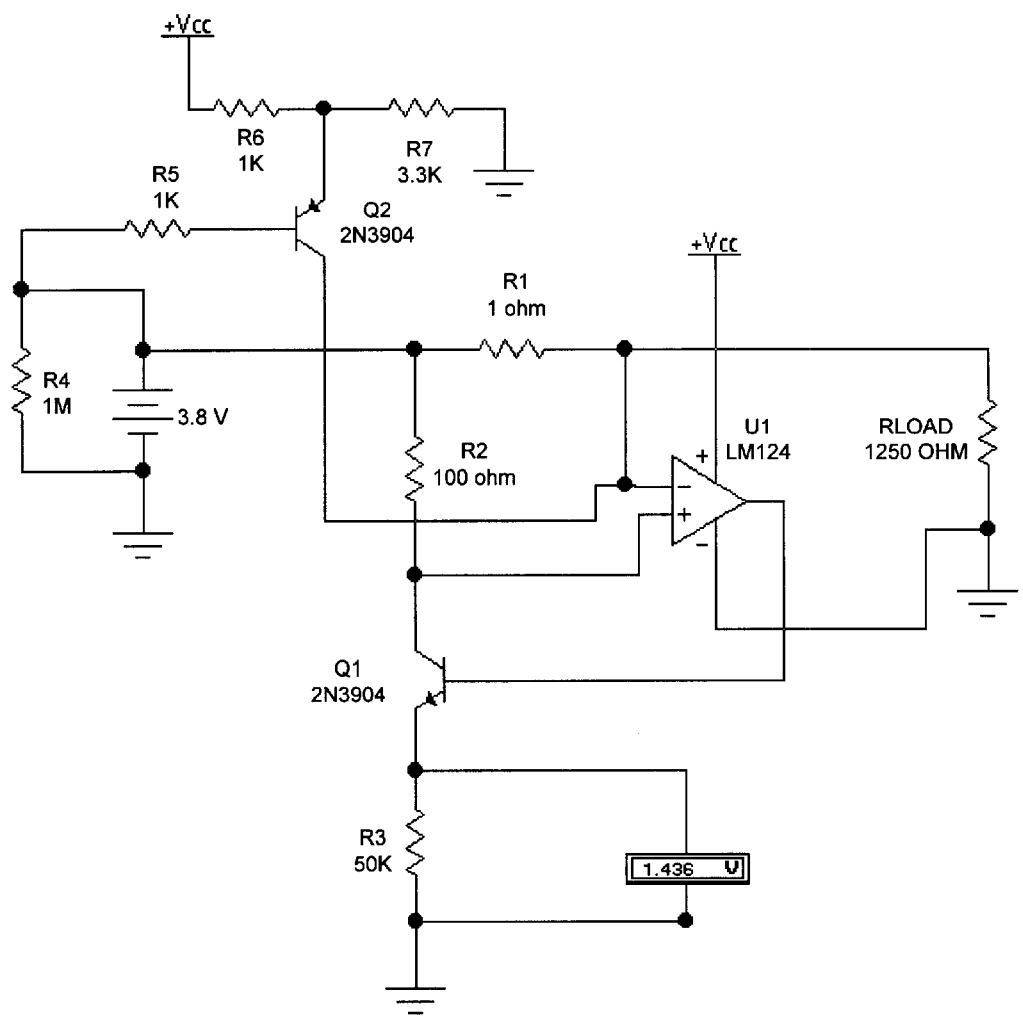
FIG. 8 is a circuit diagram describing a current-sensing circuit that is suitable for use in connection with one or more embodiments of the invention.

FIG. 8 shows one exemplary current-sensing circuit that is suitable for use in connection with the embodiments described above. The current-sensing circuit includes op amp U1, transistor Q1, and resistors R1, R2, and R3. The circuit senses the current through R1 and provides an output voltage across R3. The output voltage is related to the input current by the following equation:

$V_{Out} = [(R1*R3)/R2]*I_L$, where $I_L$ is the current through R1.

With the values as shown, a multiplier of 500 is obtained. In this example, the 3.8V voltage source represents the Power_On signal, while $R_{LOAD}$ represents a turn on circuit in a node's power supply. Q2 and R4 are used to force U1's output to zero when the Power_On signal is not asserted. R6 and R7 form a voltage divider in order to assure the correct polarization of Q2. $V_{Out}$ is used to drive a transistor that will drive a relay in the switching circuit.

Figure 9:
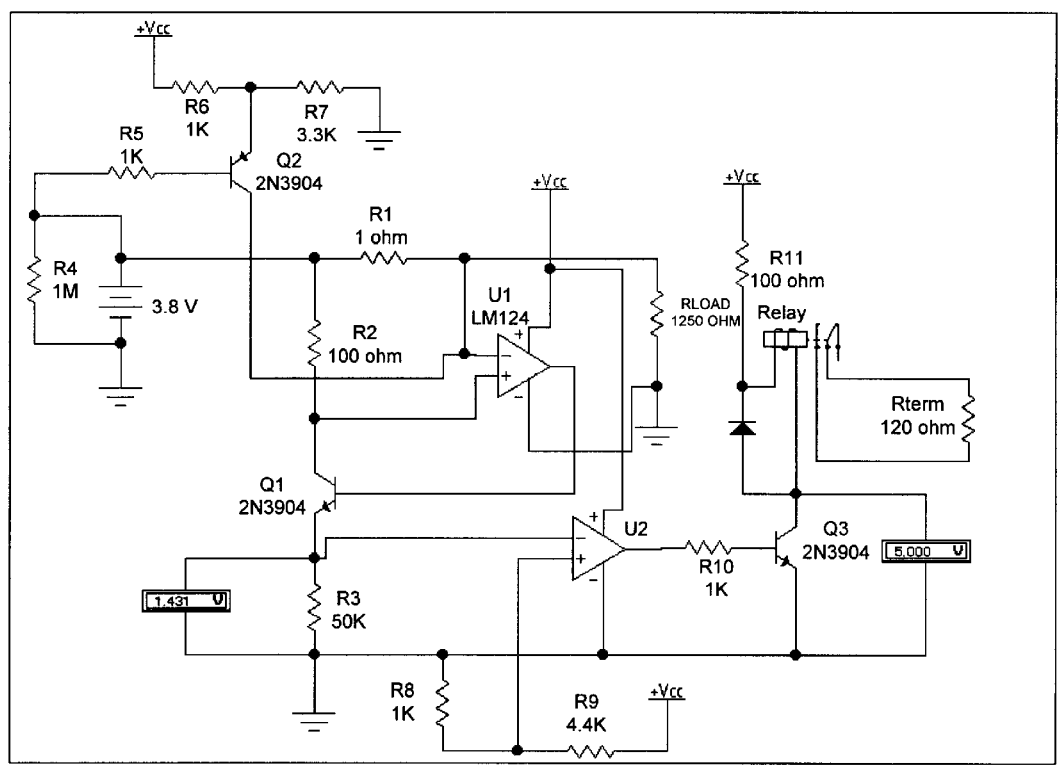
FIG. 9 is a circuit diagram describing a termination circuit in accordance with one or more embodiments of the invention, and that incorporates the current-sensing circuit of FIG. 8.

FIG. 9 shows the above current-sensing circuit incorporated into a termination circuit that includes a switching circuit. Here, op amp U2 is used in order to not affect the resistive values used in the current monitoring circuit. Resistors R8 and R9 are used to eliminate any offset problems. Transistor Q3 drives a relay coil that, in turn, selectively enables a termination resistor $R_{term}$ that provides the reflection-reducing characteristics discussed above.

In one example, the ISO 11898 standard specifies the use of a differential signal composed of two wires, i.e. lines 14, 16, with a nominal characteristic line impedance of 120 ohms. This standard also specifies a resistive load of 60 ohms between these two lines. This resistive load is necessary for the CAN bus to communicate as when the two lines are left open (without any termination resistor), no communication is possible. In order to meet these requirements, the inventive methods and systems provide for automatic termination when communication takes place regardless of the number of nodes present in the CAN bus system. In the past, adequate termination of the CAN bus required termination resistors at the ends of each branch of the CAN bus. In a printer system that employs a bus, termination resistors would have to be placed at the end of each branch of this bus. For printer systems with a port for input devices and another port for output devices, the requirements for adequate termination require that termination resistors be placed at the last device or node of each port. With different configurations, any device can be the last device in its corresponding chain in a one configuration, and not the last device in its corresponding chain in another configuration. Accordingly, individual users of this system would have to determine which device was the end of the line for a particular configuration, and then take steps to ensure proper termination of the CAN bus during operation. This would typically have to be done for each different configuration when the last device in the chain changed. Principles of the present invention provide for flexible solutions to terminating CAN busses by giving each node the ability to terminate the CAN bus when it is the last node in its associated chain. Previously, CAN bus systems needed two termination resistors, one on each end and were very inflexible and cumbersome to use, particularly when systems needed to be reconfigured. Here, since each node is provided with its own mechanism to terminate the CAN bus, there is no need to hardwire the CAN bus. This can, in turn, increase flexibility in that new nodes or devices can be added, without concerns about termination of the CAN bus. That is, because each node can terminate the CAN bus, when appropriate, new nodes that carry in-place termination circuits can be quickly and conveniently added. Other advantages will be apparent to those of skill in the art.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A CAN bus termination circuit comprising:
   a first circuit in electrical communication with a CAN bus and configured to monitor an electrical operating parameter associated with operation of the CAN bus, the electrical operating parameter being associated with whether or not a power on signal has been generated by one node connected with the CAN bus for a next-in-line node connected with the CAN bus; and a second circuit in electrical communication with the first circuit, the second circuit being selectively enabled by the first circuit responsive to the first circuit's sensing a change in the electrical operating parameter that it is configured to monitor, the second circuit being configured to terminate the CAN bus when it is enabled.

2. The CAN bus termination circuit of claim 1, wherein the first circuit comprises a current-sensing circuit that is configured to sense an operating current associated with operation of the CAN bus.

3. The CAN bus termination circuit of claim 1, wherein the first circuit comprises a switching circuit that is configured to selectively incorporate the second circuit responsive to sensing the change in the electrical operating parameter.

4. The CAN bus termination circuit of claim 1, wherein the first circuit comprises:

a current-sensing circuit that is configured to sense an operating current associated with operation of the CAN bus; and a switching circuit that is configured to selectively incorporate the second circuit responsive to sensing the change in the electrical operating parameter.

5. The CAN bus termination circuit of claim 1, wherein the second circuit comprises a signal reflection-reducing circuit.

6. The CAN bus termination circuit of claim 1, wherein the second circuit comprises a resistive circuit.

7. The CAN bus termination circuit of claim 1, wherein:

the first circuit comprises:

a current-sensing circuit that is configured to sense an operating current associated with operation of the CAN bus; and a switching circuit that is configured to selectively incorporate the second circuit responsive to sensing the change in the electrical operating parameter; and wherein the second circuit comprises a signal reflection-reducing circuit.

8. A CAN bus system comprising:

a CAN bus;

a plurality of nodes distributed along and operably connected with the CAN bus;

a power-on signal generation circuit having an output line that is coupled with the plurality of nodes and configured to enable the nodes; and for each node:

a termination circuit connected to the output line and being configured to monitor for whether one node on the CAN bus has enabled a next-in-line node on the CAN bus, and responsive to sensing that the one node has not enabled the next-in-line node, terminate the CAN bus.

9. The CAN bus system of claim 8, wherein the termination circuit comprises a current-sensing circuit that senses current flow through the output line.

10. The CAN bus system of claim 8, wherein the termination circuit comprises a switchable signal-reflection-reducing circuit configured to, upon termination of the CAN bus, reduce sign reflection in the CAN bus.

11. The CAN bus system of claim 8, wherein the termination circuit comprises:

a current-sensing circuit that monitors current flow through the output line; and a switchable signal-reflection-reducing circuit connected with the current-sensing circuit and configured to be selectively switched by the current-sensing circuit when the current-sensing circuit senses a predetermined current magnitude through the output line, the switchable signal-reflection reducing circuit being configured to, upon termination of the CAN bus, reduce signal reflection in the CAN bus.

12. The CAN bus system of claim 8, wherein the termination circuit comprises a switchable signal-reflection-reducing circuit having a resistive element configured to, upon termination of the CAN bus, reduce signal reflection in the CAN bus.

13. The CAN bus system of claim 8, wherein:

the CAN bus has first and second signal-carrying lines; and the termination circuit comprises:

a switching circuit connected with the first and second signal-carrying lines and having an output;

a resistive circuit connected with the output of the switching circuit, the resistive circuit being configured to reduce signal reflection in the first and second signal-carrying lines; and a current-sensing circuit connected with the switching circuit that monitors current flow through the output line, and further wherein the current-sensing circuit is configured to switch the switching circuit between an enabled state that incorporates the resistive circuit, and a disabled state that does not incorporate the resistive circuit.

14. A CAN bus auto-termination method comprising:

monitoring an electrical operating parameter associated with operation of at least one CAN bus node of a CAN bus, said electrical operating parameter being associated with whether the one CAN bus node has generated a signal that enables a next-in-line CAN bus node; and terminating the CAN bus, responsive to the one CAN bus node not generating a signal that enables the next-in-line CAN bus node.

15. The method of claim 14, wherein said monitoring comprises monitoring an electrical operating parameter associated with operation of a plurality of parallel-connected CAN bus nodes.

16. The method of claim 14, wherein said terminating comprises enabling a circuit that is configured to reduce signal reflection in the CAN bus.

17. The method of claim 14, wherein said terminating comprises incorporating a resistive element with the at least one CAN bus node.

18. The method of claim 14, wherein:

said monitoring comprises monitoring an electrical operating parameter associated with operation of a plurality of parallel-connected CAN bus nodes; and said terminating comprises enabling a circuit that is configured to reduce signal reflection in the CAN bus.

19. The method of claim 14, wherein:

said monitoring comprises monitoring an electrical operating parameter associated with operation of a plurality of parallel-connected CAN bus nodes; and said terminating comprises incorporating a resistive element with the at least one CAN bus node.

* * * * *